United States Patent
Murata et al.

(10) Patent No.: US 8,901,863 B2
(45) Date of Patent: Dec. 2, 2014

(54) MOTOR CONTROL DEVICE

(75) Inventors: Hiromi Murata, Aichi (JP); Masamitsu Hamasaki, Aichi (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 105 days.

(21) Appl. No.: 13/564,284

(22) Filed: Aug. 1, 2012

(65) Prior Publication Data

US 2013/0033209 A1    Feb. 7, 2013

(30) Foreign Application Priority Data

Aug. 2, 2011    (JP) .................................. 2011-169409

(51) Int. Cl.
| | |
|---|---|
| *H02P 6/08* | (2006.01) |
| *B62D 5/04* | (2006.01) |
| *H02P 23/14* | (2006.01) |
| *H02P 6/00* | (2006.01) |

(52) U.S. Cl.
CPC .............. *B62D 5/0484* (2013.01); *H02P 23/14* (2013.01); *B62D 5/049* (2013.01); *H02P 6/002* (2013.01)
USPC ............ 318/400.06; 318/400.04; 318/400.01; 318/700

(58) Field of Classification Search
CPC ................................. H02P 23/14; B62D 5/049
USPC .................. 318/400.06, 400.04, 400.01, 700
See application file for complete search history.

(56) References Cited

U.S. PATENT DOCUMENTS

| | | | | |
|---|---|---|---|---|
| 5,480,000 | A | * | 1/1996 | Daido et al. ................... 180/446 |
| 5,698,956 | A | * | 12/1997 | Nishino et al. ................ 318/432 |
| 5,765,661 | A | * | 6/1998 | Matsuoka ...................... 180/446 |
| 6,392,908 | B2 | * | 5/2002 | Miyazaki et al. ............... 363/98 |

FOREIGN PATENT DOCUMENTS

| | | |
|---|---|---|
| JP | H07-329803 A | 12/1995 |
| JP | 9024846 A | 1/1997 |
| JP | 2002-345101 A | 11/2002 |
| JP | 2005-249780 A | 9/2005 |
| JP | 2007-003081 A | 1/2007 |
| JP | 2008307975 A | 12/2008 |
| JP | 2009052992 A | 3/2009 |
| JP | 2009-139223 A | 6/2009 |

OTHER PUBLICATIONS

English Patent Abstract of JP 2008-307975, Publication Date: Dec. 25, 2008 (1 Page).

(Continued)

*Primary Examiner* — David S Luo
(74) *Attorney, Agent, or Firm* — Osha Liang LLP

(57) ABSTRACT

A motor control device has a motor driving circuit for driving a motor, a current detection circuit for detecting a motor current flowing through the motor driving circuit, and a controller for calculating a detected value of the motor current based on an output of the current detection circuit, comparing the detected value with a target value of the motor current, and generating a command value for allowing a motor current of the target value to flow through the motor based on a deviation therebetween, to output the command value to a motor driving circuit. The current detection circuit is configured of a first current detection circuit having a positive first gain and a second current detection circuit having a negative second gain obtained by inverting the first gain.

3 Claims, 6 Drawing Sheets

(56) References Cited

OTHER PUBLICATIONS

English Patent Abstract of JP 2009-052992, Publication Date: Mar. 12, 2009 (1 Page).

English Patent Abstract of JP 9-024846, Publication Date: Jan. 28, 1997 (1 Page).

Japanese Office Action for Application No. 2011-169409, mailed on Jul. 29, 2014 (6 pages).

* cited by examiner

MOTOR CONTROL DEVICE

TECHNICAL FIELD

The present invention relates to a motor control device for detecting a current flowing through a motor and performing feedback control based on the detected value.

BACKGROUND ART

In an electric power steering device of a vehicle, an electric motor such as a blushless motor is provided for providing a steering mechanism with steering auxiliary force in accordance with a steering torque of a wheel. As a device for controlling this motor, there is known a motor control device using a PWM (Pulse Width Modulation) system (e.g., see Unexamined Japanese Patent Publication No. H9-24846, Unexamined Japanese Patent Publication No. 2008-307975).

Generally, the motor control device using the PWM system is provided with an inverter circuit, a PWM circuit for driving this inverter circuit, and a control part for controlling this PWM circuit. The inverter circuit is provided with a plurality of pairs (three pairs in the case of a three-phase motor) of an upper arm and a lower arm each having a switching element. The control part calculates a target value of a current to be allowed to flow through the motor based on a steering torque detected by a torque sensor. Based on a deviation between a detected value of a current actually flowing through the motor and the target value, a command value is generated for allowing the motor current of the target value to flow through a motor 4, and outputted to a PWM circuit. The PWM circuit generates a PWM signal having a predetermined duty based on this command value, and drives the inverter circuit with this PWM signal. As a result, each switching element performs an on/off operation, and in accordance therewith, a current is supplied from the power source to the motor via the inverter circuit, to rotate the motor.

In the motor control device as described above, the current (hereinafter referred to as "motor current") flowing through the motor is detected by use of a resistor for current detection, called a shunt resistor. In the motor control device described in Unexamined Japanese Patent Publication No. H9-24846, a shunt resistor is provided in a lower arm of each phase, and a voltage at each end of each shunt resistor is measured, to detect the motor current. However, in this configuration, the shunt resistors are required in number corresponding to the number of phases, thus leading to a cost increase. Thereat, a motor control device made capable of detecting the motor current by use of a single shunt resistor has been put into practice.

SUMMARY

One or more embodiments of the present invention provides a motor control device capable of holding a normal operation for motor control even in the case of occurrence of failure of a current detection circuit.

In accordance with one or more embodiments of the present invention, a motor control device includes: a motor driving circuit for driving a motor; a current detection circuit for detecting a motor current flowing through the motor driving circuit; and a controller for calculating a detected value of the motor current based on an output of the current detection circuit, comparing the detected value with a target value of the motor current, and generating a command value for allowing a motor current of the target value to flow through the motor based on a deviation therebetween, to output the command value to a motor driving circuit. The current detection circuit is configured of a first current detection circuit having a positive first gain, and a second current detection circuit having a negative second gain obtained by inverting the first gain. The controller calculates a first detected value of the motor current based on an output of the first current detection circuit, and also calculates a second detected value of the motor current based on an output of the second current detection circuit. The controller adopts the first detected value or the second detected value as the detected value of the motor current when a sum of the first detected value and the second detected value satisfies a first condition. Further, the controller adopts the first detected value as the detected value of the motor current when the sum of the first detected value and the second detected value does not satisfy a first condition and the first detected value and the command value satisfy a second condition. Moreover, the controller adopts the second detected value as the detected value of the motor current when the sum of the first detected value and the second detected value does not satisfy a first condition and the second detected value and the command value satisfy a second condition.

In such a manner, by making the current detection circuit duplex, even when one current detection circuit fails, the motor current can be detected by the other current detection circuit, thereby leading to improvement in reliability of current detection. Further, since the output of the second current detection circuit is one obtained by inverting the output of the first current detection circuit, the abnormality of the current detection circuit can be accurately detected based on the sum of the first detected value and the second detected value without the influence of disturbance or the like. Moreover, it is possible to determine which current detection circuit is abnormal based on the first detected value, the second detected value and the command value, so as to acquire an accurate current value from the output of the current detection circuit where the abnormality has not occurred. For this reason, even when one current detection circuit fails, a normal operation for motor control can be held.

In one or more embodiments of the present invention, the controller may execute control of the motor under a fixed limit when the sum of the first detected value and the second detected value does not satisfy the first condition and the first detected value or the second detected value and the command value satisfy the second condition.

Further, in one or more embodiments of the present invention, the controller may stop control of the motor when the sum of the first detected value and the second detected value does not satisfy a first condition and the first detected value, the second detected value and the command value do not satisfy the second condition.

According to one or more embodiments of the present invention, it is possible to provide a motor control device capable of holding a normal operation for motor control even in the case of occurrence of failure of a current detection circuit.

DETAILED DESCRIPTION

Hereinafter, embodiments of the present invention will be described with reference to the drawings. In each figure, the same portion or corresponding portion is provided with the same numeral. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 5:
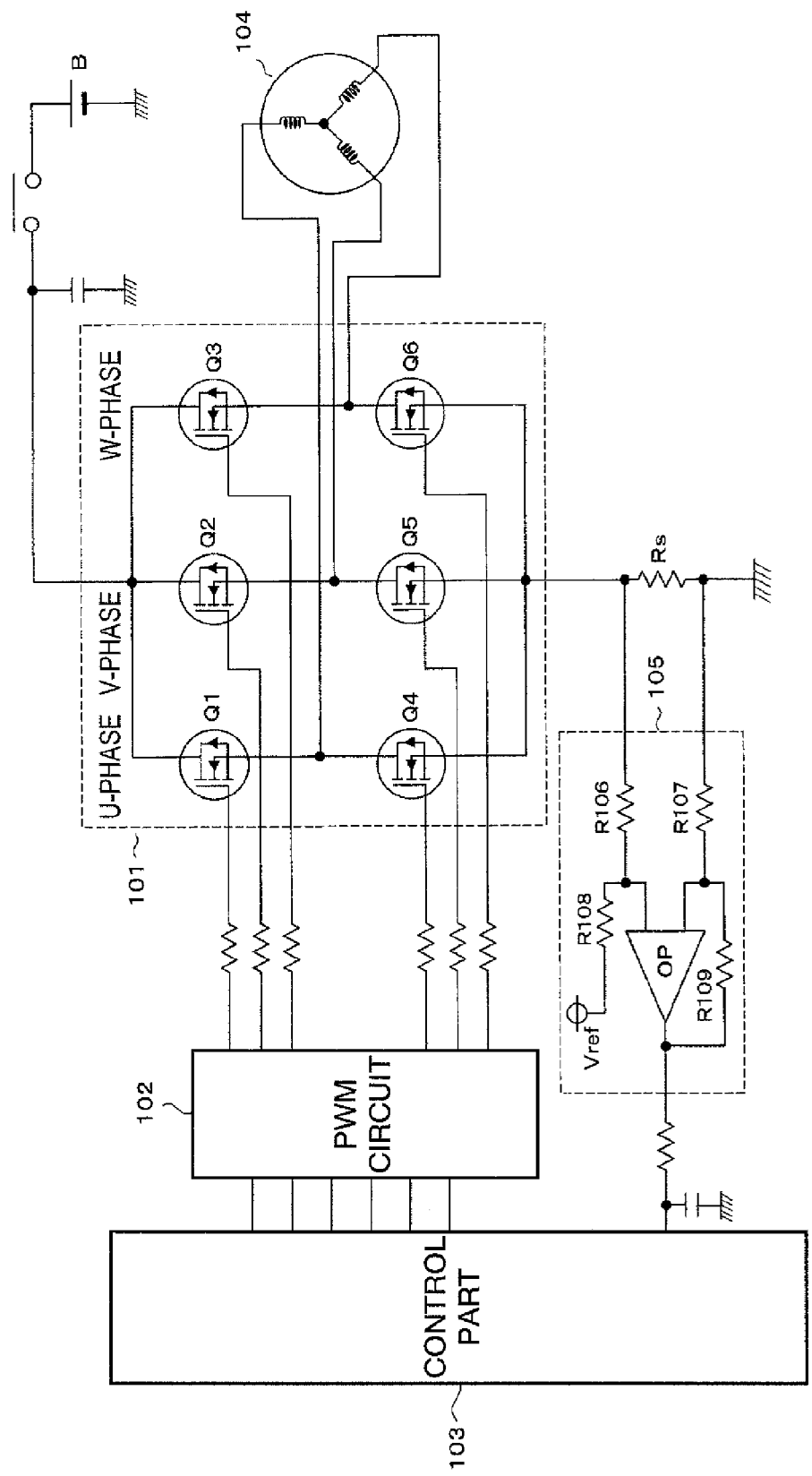
FIG. 5 is a circuit diagram showing a conventional example of the motor control device.

FIG. 5 shows one example of the motor control device by use of a single shunt resistor. The motor control device is provided with an inverter circuit 101 for supplying a current to a motor 104, a PWM circuit 102 for driving the inverter circuit 101, a control part 103 for controlling the PWM circuit 102, a shunt resistor Rs for detecting a current flowing through the inverter circuit 101, and a current detection circuit 105 for outputting a voltage in accordance with the motor current based on a voltage at each end of the shunt resistor Rs. The motor 104 is, for example, a three-phase blushless motor used for an electric power steering device of a vehicle.

The inverter circuit 101 is configured of a three-phase bridge circuit having switching elements Q1 to Q6. The PWM circuit 102 provides a PWM signal to each of the switching elements Q1 to Q6 in the inverter circuit 101, to drive each switching element. The control part 103 calculates a target value of a current to be allowed to flow through the motor 104 based on a steering torque acquired from a torque sensor, not shown, and also calculates a detected value of the motor current from an output of the current detection circuit 105. Further, the control part 103 calculates a command value based on a deviation between the target value and the detected value such that the value of the current flowing through the motor 104 becomes the target value, and outputs this command value to the PWM circuit 102. The PWM circuit 102 generates six kinds of PWM signals having duties in accordance with the command value from the control part 103, to make the switching elements Q1 to Q6 perform on/off operations with these PWM signals. By on/off of the switching elements Q1 to Q6, the current flows through the motor 104 from a power source B via the inverter circuit 101, to rotate the motor 104. Revolutions of the motor 104 can be controlled by the duty of the PWM signal.

The current detection circuit 105 is made up of a differential amplifier OP and resistors R106 to R109, and outputs a voltage proportional to the motor current flowing through the shunt resistor Rs based on a voltage at each end of the shunt resistor Rs and a reference voltage Vref.

Figure 6:
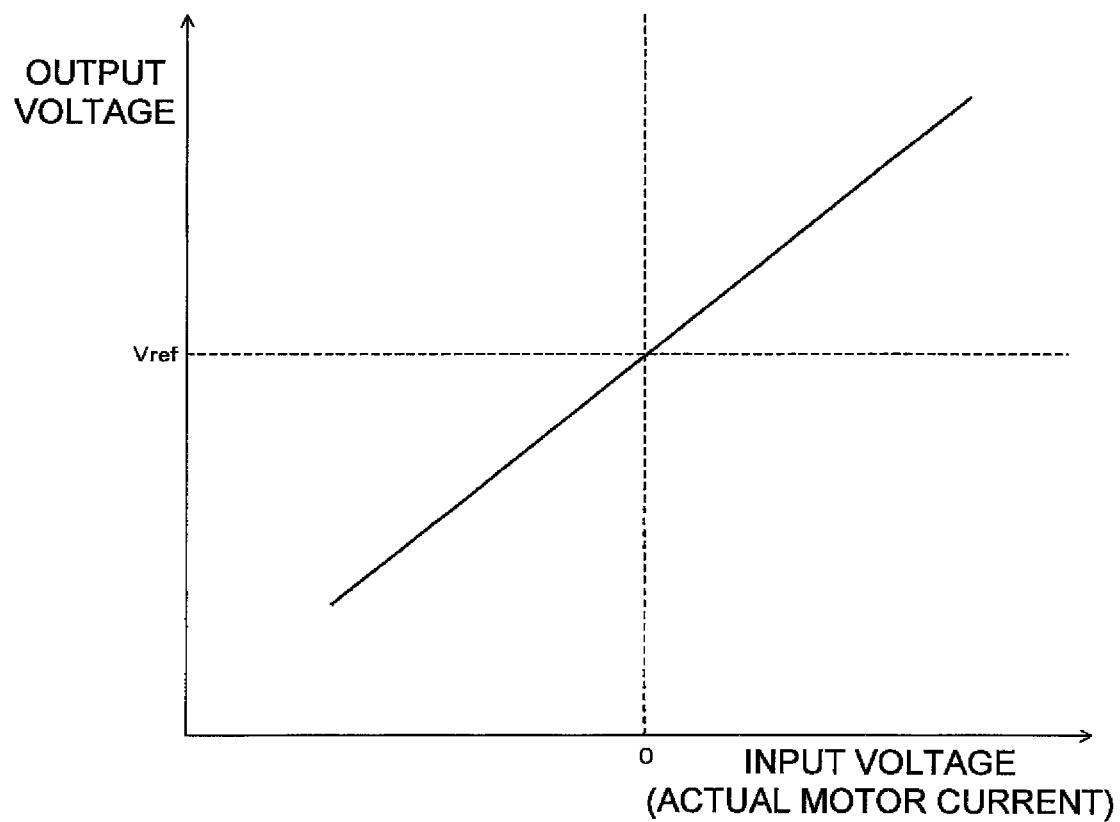
FIG. 6 is a characteristic diagram of the current detection circuit in a conventional example.

FIG. 6 shows an input/output characteristic of the current detection circuit 105. A horizontal axis represents an input voltage of the current detection circuit 105, namely a motor current (actual motor current) flowing through the shunt resistor Rs. A vertical axis represents an output voltage of the current detection circuit 105, namely a voltage proportional to the actual motor current. When the actual motor current is zero, the output voltage is the reference voltage Vref. When the actual motor current becomes larger than zero (in the case of the current direction being positive), the output voltage accordingly becomes larger than the reference voltage Vref. On the other hand, when the actual motor current becomes smaller than zero (in the case of the current direction being negative), the output voltage accordingly becomes smaller than the reference voltage Vref. Unexamined Japanese Patent Publication No. 2009-52992 describes a current detection circuit having such a characteristic.

Incidentally, as for an electric power steering system, in the light of being compliant with functional safety standards on electric power steering systems of automobiles (ISO26262), there has recently been an increasing desire for prompt detection of failure of a circuit component and further continuous operation of the system. However, a current detecting method by use of the foregoing single shunt resistor performs as follows due to provision of only one current detection circuit 105.

In the case of failure of the current detection circuit 105, as a method for determining the abnormality of the circuit, there for example is a method for verifying a divergence between a command value of the motor current to be given from the control part 103 to the PWM circuit 102 and a detected value of the motor current calculated based on an output of the current detection circuit 105. In this method, a divergence amount between the command value and the detected value is compared with a previously set threshold, and when the divergence amount is not smaller than the threshold, the current detection circuit 105 is determined as abnormal.

However, by the above method, the divergence amount fluctuates in accordance with disturbance or the like, to cause low accuracy in detection of the circuit abnormality, thus making it difficult to accurately determine the abnormality. Further, even when the abnormality can be detected, an accurate current value cannot be acquired, thus necessitating another methods for calculating the current value. It is to be noted that, although there is a method for estimating a current from a terminal voltage of the motor or the like to control the motor, a current flowing through the inverter circuit cannot be directly detected by this method. It has thus been difficult to accurately detect the current so as to ensure a normal state of the steering system.

Figure 1:
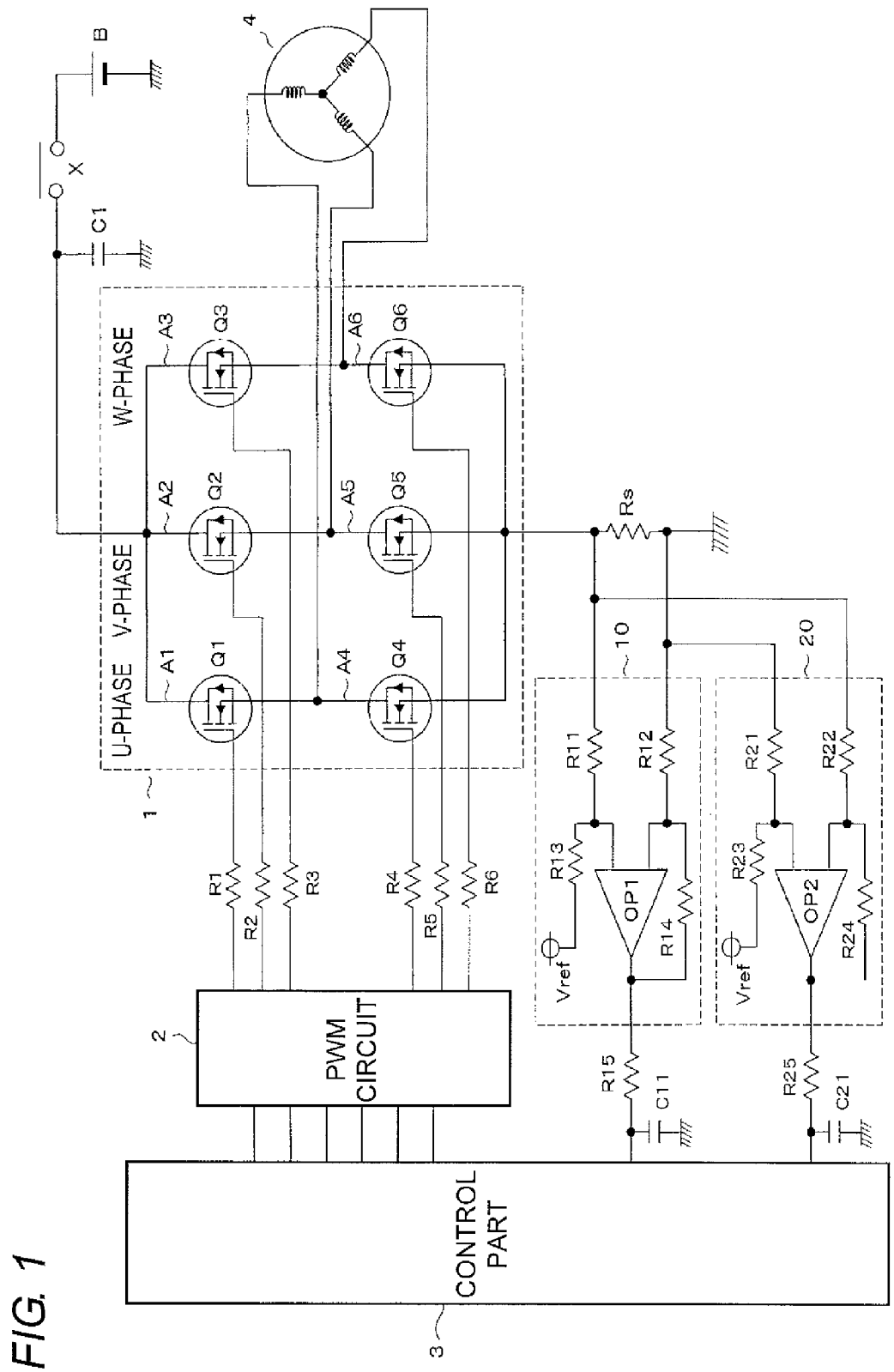
FIG. 1 is a circuit diagram of a motor control device according to one or more embodiments of the present invention.

FIG. 1 shows one example of a motor control device according to one or more embodiments of the present invention. The motor control device is provided with an inverter circuit 1 for supplying a current to a motor 4, a PWM circuit 2 for driving the inverter circuit 1, a control part 3 for controlling the PWM circuit 2, a shunt resistor Rs for detecting a current flowing through the inverter circuit 1, and a first current detection circuit 10 and a second current detection circuit 20 for outputting a voltage in accordance with the motor current based on a voltage at each end of the shunt resistor Rs. A power source B supplies a power supply voltage to the inverter circuit 1 via a switch contact X and a capacitor C1. The motor 4 is, for example, a three-phase blushless motor used for an electric power steering device of a vehicle.

The inverter circuit 1 is configured of a three-phase bridge, provided with three pairs of upper and lower arms corresponding to a U-phase, a V-phase and a W-phase. An upper arm A1 of the U-phase has a switching element Q1, and a lower arm A4 of the U-phase has a switching element Q4. An upper arm A2 of the V-phase has a switching element Q2, and a lower arm A5 of the V-phase has a switching element Q5. An upper arm A3 of the W-phase has a switching element Q3, and a lower arm A6 of the W-phase has a switching element Q6. These switching elements Q1 to Q6 are each made up of an FET (Field Effect Transistor). Respective gates of the switching elements Q1 to Q6 are respectively connected to the PWM circuit 2 via resistors R1 to R6. The inverter circuit 1 constitutes the motor driving circuit in one or more embodiments of the present invention along with the PWM circuit 2.

The shunt resistor Rs for detecting a current (motor current) flowing through the motor 4 is made up of a single resistor, and connected to between the inverter circuit 1 and a ground. A voltage at each end of the shunt resistor Rs is provided to the first current detection circuit 10, and is also provided to the second current detection circuit 20.

The first current detection circuit 10 is made up of a differential amplifier OP1 and resistors R11 to R14, and outputs a voltage proportional to the motor current flowing through the shunt resistor Rs based on the voltage at each end of the shunt resistor Rs and a reference voltage Vref. One input terminal of the differential amplifier OP1 is connected with one end of the resistor R11, and is connected with one end of the resistor R13. The other end of the resistor R11 is connected to one end of the shunt resistor Rs. The other end of the resistor R13 is applied with the reference voltage Vref. A value of Vref is, for example, 2.5 [V]. The other input terminal of the differential amplifier OP1 is connected with one end of the resistor R12, and is connected with one end of the resistor R14. The other end of the resistor R12 is connected to the other end (ground) of the shunt resistor Rs. The other end of the resistor R14 is connected to an output terminal of the differential amplifier OP1. The output terminal of the differential amplifier OP1 is connected to the control part 3 via a filter circuit made up of a resistor R15 and a capacitor C11.

The second current detection circuit 20 is made up of a differential amplifier OP2 and resistors R21 to R24, and outputs a signal obtained by inverting the output of the first current detection circuit 10, as described later. One input terminal of the differential amplifier OP2 is connected with one end of the resistor R21, and is connected with one end of the resistor R23. The other end of the resistor R21 is connected to the other end (ground) of the shunt resistor Rs. The other end of the resistor R23 is applied with the reference voltage Vref. A value of Vref is, for example, 2.5 [V]. The other input terminal of the differential amplifier OP2 is connected with one end of the resistor R22, and is also connected with one end of the resistor R24. The other end of the resistor R22 is connected to one end of the shunt resistor Rs. The other end of the resistor R24 is connected to an output terminal of the differential amplifier OP2. The output terminal of the differential amplifier OP2 is connected to the control part 3 via a filter circuit made up of a resistor 25 and a capacitor C21.

When a gain of the first current detection circuit 10 is referred to as G, a gain of the second current detection circuit 20 is −G. That is, the first current detection circuit 10 has a positive first gain G, and the second current detection circuit 20 has a negative second gain −G obtained by inverting the first gain G. Therefore, the output of the second current detection circuit 20 is one obtained by inverting the output of the first current detection circuit 10.

The control part 3 is made up of a CPU and a memory, and constitutes the controller in one or more embodiments of the present invention. The control part 3 is inputted with the outputs of the first current detection circuit 10 and the second current detection circuit 20, and inputted with a torque value from a torque sensor for detecting a steering torque, the sensor being not shown. The control part 3 calculates a detected value of the motor current based on the outputs of the first current detection circuit 10 and the second current detection circuit 20, and also calculates a target value of a current to be allowed to flow through the motor 4 based on the torque value. The calculated detected value is compared with the target value, and based on a deviation therebetween, a command value is generated for allowing the motor current of the target value to flow through the motor 4. This command value is provided to the PWM circuit 2.

The PWM circuit 2 generates six kinds of PWM signals having predetermined duties based on the command value provided from the control part 3. These PWM signals are supplied to gates of the switching elements Q1 to Q6 in the inverter circuit 1 via the resistors R1 to R6. Thereby, the switching elements Q1 to Q6 perform on/off operations, to supply the current from a power source B to the motor 4 via the inverter circuit 1, to rotate the motor 4. Revolutions of the motor 4 can be controlled by the duty of the PWM signal. In such a manner, feedback control is performed based on the current detected by the shunt resistor Rs.

Hereinafter, there will be described a method for detecting the abnormality of the current detection circuits 10, 20 in the foregoing motor control device. Hereinafter, offset abnormality and gain abnormality are taken as examples of the abnormality of the current detection circuits 10, 20.

(1) Case of Offset Abnormality

Figure 2:
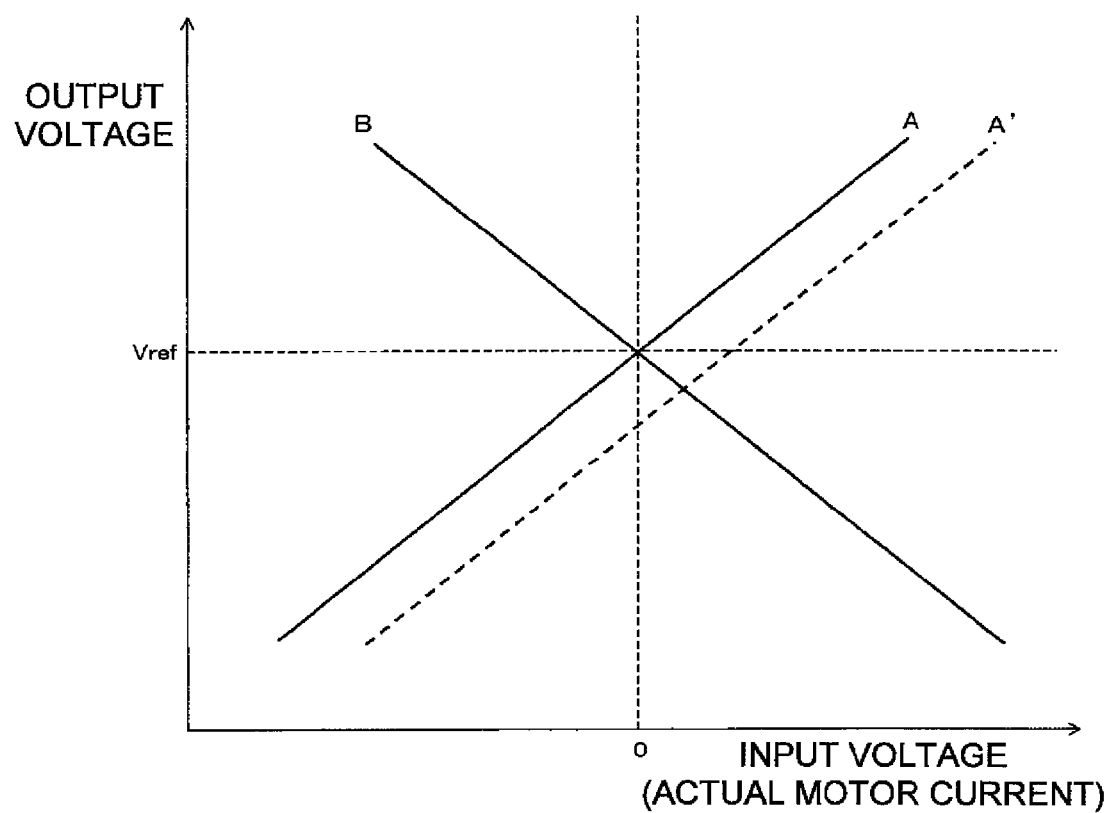
FIG. 2 is a characteristic diagram of a current detection circuit for explaining offset abnormality.

FIG. 2 shows input/output characteristics of a current detection circuit for explaining the offset abnormality. A horizontal axis represents an input voltage of the current detection circuits 10, 20, namely a motor current (actual motor current) flowing through the shunt resistor Rs. A vertical axis represents an output voltage of the current detection circuits 10, 20, namely a voltage proportional to the actual motor current. Symbol A indicated by a solid line denotes an output voltage of the first current detection circuit 10 at the normal time, and symbol B indicated by a solid line denotes an output voltage of the second current detection circuit 20 at the normal time. The output voltage B is one obtained by inverting the output voltage A.

At the normal time, when the actual motor current is zero (when the current does not flow through the shunt resistor Rs), the output voltage A of the first current detection circuit 10 is the reference voltage Vref, and the output voltage B of the second current detection circuit 20 is also the reference voltage Vref. When a positive current flows through the shunt resistor Rs and the actual motor current becomes larger than zero, the output voltage A of the first current detection circuit 10 becomes larger than the reference voltage Vref and the output voltage B of the second current detection circuit 20 becomes smaller than the reference voltage Vref. On the other hand, when a negative current flows through the shunt resistor Rs and the actual motor current becomes smaller than zero, the output voltage A of the first current detection circuit 10 becomes smaller than the reference voltage Vref and the output voltage B of the second current detection circuit 20 becomes larger than the reference voltage Vref. Therefore, at the normal time, a sum of the output voltage A and the output voltage B is theoretically constantly 2×Vref.

A dotted line A' of FIG. 2 indicates a state where the output voltage A at the normal time has shifted due to failure of the first current detection circuit 10. That is, even when the actual motor current is zero, the output voltage A' of the first current detection circuit 10 is not the reference voltage Vref, and an offset has occurred (offset abnormality). In this state, a sum of the output voltage A' and the output voltage B is smaller than 2×Vref. Therefore, a difference (absolute value) between an added value of the respective outputs of the current detection circuits 10, 20 and 2×Vref is compared with a threshold, and when this difference is not smaller than the threshold, it can be determined that the abnormality has occurred in the current detection circuit. However, a similar phenomenon occurs also in a case where the first current detection circuit 10 is normal while the offset abnormality has occurred in the second current detection circuit 20, and it is thus not possible to determine in which circuit out of the first current detection circuit 10 and the second current detection circuit 20 the abnormality has occurred. A method for determining a current detection circuit where the abnormality has occurred will be described in detail later.

(2) Case of Gain Abnormality

Figure 3:
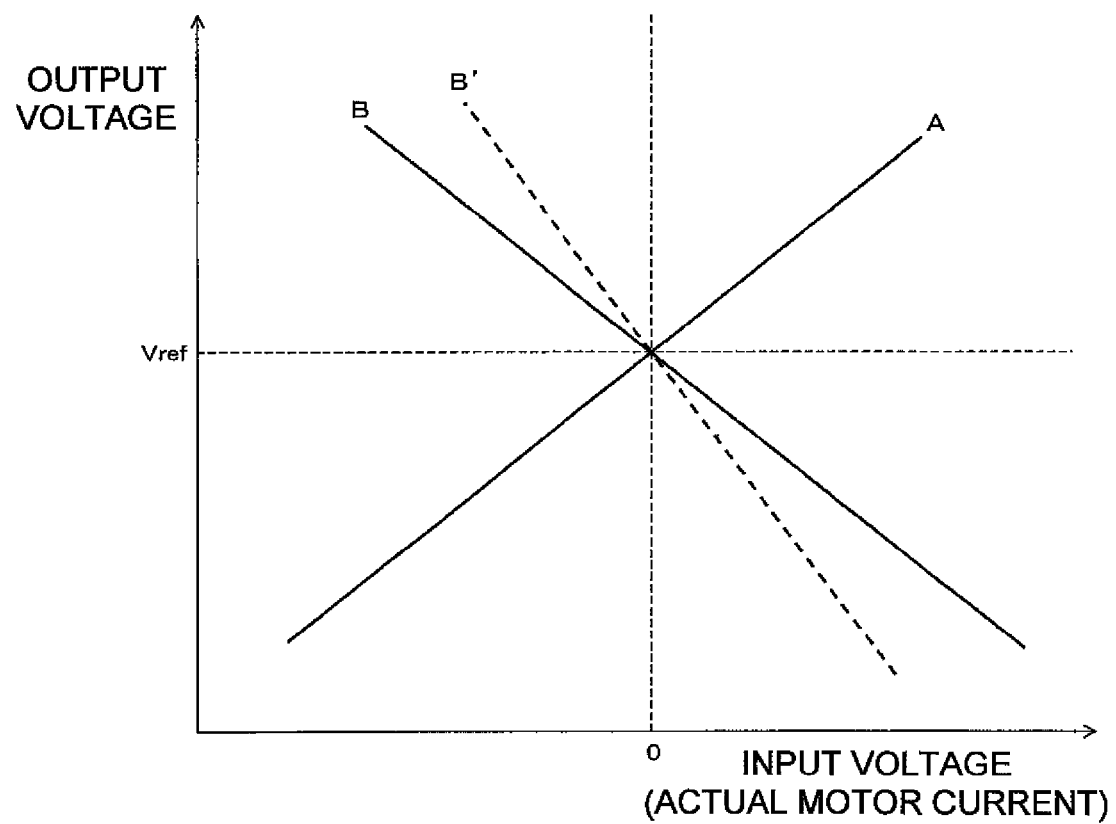
FIG. 3 is a characteristic diagram of the current detection circuit for explaining gain abnormality.

FIG. 3 shows input/output characteristics of a current detection circuit for explaining the gain abnormality. A horizontal axis and a vertical axis are the same as those of FIG. 2. Further, a symbol A (output voltage of the first current detection circuit 10 at the normal time) indicated by a solid line, and symbol B (output voltage of the second current detection circuit 20 at the normal time) indicated by a solid line are also the same as those of FIG. 2. That is, the output voltage B is one obtained by inverting the output voltage A, and at the normal time, the sum of the output voltage A and the output voltage B is theoretically constantly 2×Vref.

A dotted line B' of FIG. 3 indicates a state where the characteristic of the output voltage has changed due to failure of the second current detection circuit 20. That is, as a result of an increase in second gain due to the abnormality of the second current detection circuit 20, an inclination of the output voltage B' is larger than an inclination of the output voltage B at the normal time (gain abnormality). In this state, a sum of the output voltage A and the output voltage B' is smaller than 2×Vref when the actual motor current is larger than zero, and a sum of the output voltage A and the output voltage B' is larger than 2×Vref when the actual motor current is smaller than zero. Therefore, in either case, a difference (absolute value) between an added value of the respective outputs of the current detection circuits 10, 20 and 2×Vref is compared with a threshold, and when this difference is not smaller than the threshold, it can be determined that the abnormality has occurred in the current detection circuit. However, since a similar phenomenon occurs also in a case where the second current detection circuit 20 is normal and the gain abnormality has occurred in the first current detection circuit 10, it is not possible to determine in which circuit out of the first current detection circuit 10 and the second current detection circuit 20 the abnormality has occurred. A method for determining a current detection circuit where the abnormality has occurred will be described in detail later.

Figure 4:
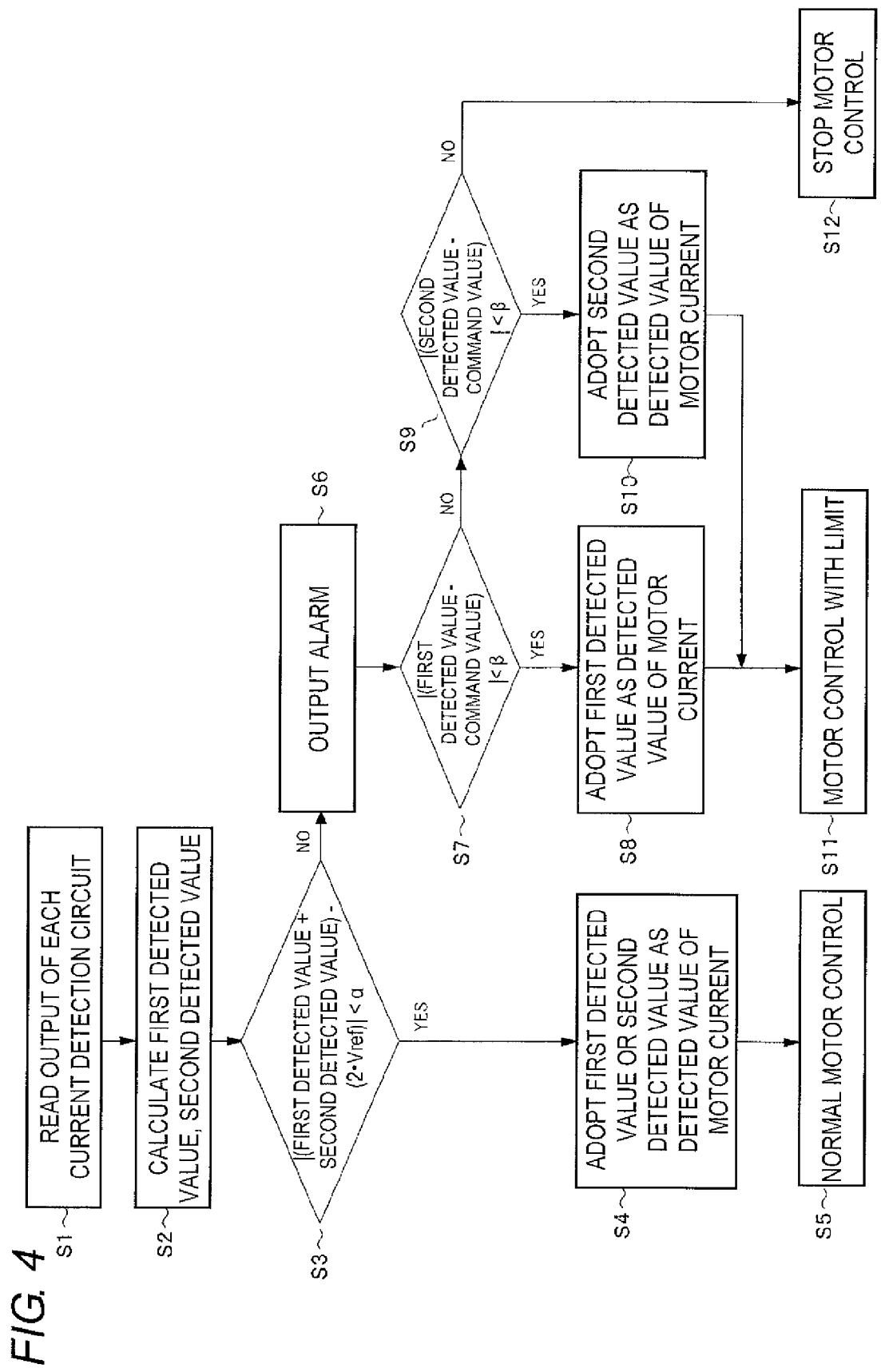
FIG. 4 is a flowchart showing a procedure for current detection.

Next, a procedure for current detection in one or more embodiments of the present invention will be described in detail with reference to a flowchart of FIG. 4. Each Step in FIG. 4 is executed by the CPU constituting the control part 3.

In Step S1, the control part 3 reads the respective outputs of the first current detection circuit 10 and the second current detection circuit 20 on predetermined timing.

In Step S2, a detected value of a motor current is calculated based on the outputs of the respective current detection circuits, having been read in Step S1. That is, the control part 3 A/D converts the output of the first current detection circuit 10 to calculate a first detected value of the motor current, and also A/D converts the output of the second current detection circuit 20 to calculate a second detected value of the motor current.

In Step S3, the first detected value and the second detected value, calculated in Step S2, are added up to calculate a sum of both values, and it is also determined whether or not an absolute value (hereinafter referred to as "added value deviation") of a difference between the sum and 2×Vref is smaller than a predetermined threshold α. The determined content in this Step S3 corresponds to the first condition in one or more embodiments of the present invention. As a result of the determination, the process goes to Step S4 when the added value deviation is smaller than a (Step S3: YES). In addition, although a value of α is set to be a value slightly larger than zero, it may be set to zero. In the case of α=0, it is determined in Step S3 whether or not |(first detected value+second detected value)−(2·Vref)|=0.

In Step S4, upon receipt of the determination that the added value deviation is smaller than a in Step S3, it is determined that neither the current detection circuits 10, 20 is abnormal, so as to adopt either the first detected value or the second detected value as the detected value of the motor current.

In Step S5, the motor 4 is controlled in accordance with normal feedback control by use of the detected current value adopted in Step S4.

On the other hand, in Step S3, when the added value deviation is not smaller than α (Step S3; NO), the process goes to Step S6.

In Step S6, upon receipt of the determination that the added value deviation is not smaller than α in Step S3, it is determined that either the current detection circuit 10 or 20 is abnormal, and the control part 3 outputs an alarm. This alarm is, for example, indicated in an indicator (illustration is omitted) provided on a dashboard at the front of a vehicle interior.

In subsequent Steps S7 to S10, it is verified in which circuit out of the first current detection circuit 10 and the second current detection circuit 20 the abnormality has occurred.

In Step S7, it is determined whether or not an absolute value (hereinafter referred to as "first divergence amount") of a difference between the first detected value and the foregoing command value is smaller than a predetermined threshold β. The determined content in this Step S7 corresponds to the second condition in one or more embodiments of the present invention along with the below-mentioned determined content in Step S9. As a result of the determination, the process goes to Step S8 when the first divergence amount is smaller than β (Step S7: YES). In addition, although a value of β set to be a value slightly larger than zero, it may be set to zero. In the case of β=0, it is determined in Step S7 whether or not |(first detected value−command value)|=0.

In Step S8, upon receipt of the determination that the first divergence amount is smaller than β in Step S7, it is determined that the first current detection circuit 10 is normal and the second current detection circuit 20 is abnormal, so as to adopt the first detected value as the detected value of the motor current.

On the other hand, in Step S7, the process goes to Step S9 when the first divergence amount is not smaller than β (Step S7: NO).

In Step S9, it is determined whether or not an absolute value (hereinafter referred to as "second divergence amount") of a difference between the second detected value and the foregoing command value is smaller than the predetermined threshold β. Then, the process goes to Step S10 when the second divergence amount is smaller than β (Step S9: YES). It should be noted that in the case of β=0, it is determined in Step S9 whether or not |(second detected value−command value)|=0, as in Step S7.

In Step S10, upon receipt of the determination that the second divergence amount is smaller than β in Step S9, it is determined that the second current detection circuit 20 is normal and the first current detection circuit 10 is abnormal, so as to adopt the second detected value as the detected value of the motor current.

In Step S11, control of the motor 4 is executed under a fixed limit by use of the first detected value adopted in Step S8 or the second detected value adopted in Step S10. Herein, the fixed limit, for example, means making the current flowing through the motor 4 less than normal to limit the steering auxiliary force. Such a limit is added because continuous flowing of the same current despite occurrence of the abnormality may contribute to increased abnormality.

On the other hand, in Step S9, the process goes to Step S12 when the second divergence amount is not smaller than β (Step S9: NO).

In Step S12, upon receipt of the determination that both the first divergence amount and the second divergence amount are not smaller than β in Steps S7, S9, it is determined that both the first current detection circuit 10 and the second current detection circuit 20 are abnormal, so as to stop control of the motor 4. Such an operation is performed because both the first detected value and the second detected value are unreliable when both the current detection circuits 10, 20 are abnormal, and the motor 4 cannot be appropriately controlled based on these detected values.

As thus described, in one or more embodiments of the present invention, the first current detection circuit 10 and the second current detection circuit 20 are provided, to make the first current detection circuit duplex. For this reason, even when one current detection circuit fails, the motor current can be detected by the other current detection circuit, thereby leading to improvement in reliability of current detection.

In addition, it is considered that, in making the current detection circuit duplex, both gains of the first current detection circuit 10 and the second current detection circuit 20 are made positive gains and abnormality determination is performed based on a difference between the outputs of the respective current detection circuits 10, 20. However, such an operation may make an erroneous determination that the circuits are normal when the reference voltage Vref fails because there is no difference in output between the current detection circuits 10 and 20. As opposed to this, in one or more embodiments of the present invention, the gain of the second current detection circuit 20 is made a negative gain obtained by inverting the gain of the first current detection circuit 10 and the abnormality of the current detection circuit is determined based on the sum of the first detected value and the second detected value. Hence the difference in output between the current detection circuits 10 and 20 occurs when the reference voltage Vref fails, whereby it is possible to accurately detect the abnormality of the current detection circuit. Further, it is possible to accurately detect the abnormality without the influence of disturbance or the like.

Moreover, in one or more embodiments of the present invention, it is possible to determine which circuit out of the current detection circuits 10, 20 is abnormal based on a result of comparison between the first detected value, the second detected value and the command value. For this reason, it is possible to acquire an accurate current value from the output of the current detection circuit where the abnormality has not occurred. Hence, even when either the current detection circuits 10 or 20 fails, a normal operation of the steering system can be held.

In the present invention, a variety of embodiments other than what were described above can be adopted. For example, although the motor control with the limit has been performed in Step S11 of FIG. 4 in the above embodiments, the motor control may be stopped in Step S11, as in Step S12. Alternatively, in Step S11, a normal motor control as in Step S5 may be performed.

Further, although the case of the offset abnormality has been taken as an example in FIG. 2 and the case of the gain abnormality has been taken as an example in FIG. 3 in the above embodiments, one or more embodiments of the present invention is useful even in the case of simultaneous occurrence of the offset abnormality and the gain abnormality.

Moreover, although the absolute value of the difference between the first detected value+the second detected value and 2×Vref has been compared with the threshold α in Step S3 of FIG. 4 in the above embodiments, in place of this, a ratio of the first detected value+the second detected value and 2×Vref may be compared with a predetermined threshold.

Similarly, although the difference between the first detected value or the second detected value and the command value has been compared with the threshold β in Steps S7, S9 of FIG. 4 in the above embodiments, in place of this, a ratio of the first detected value or the second detected value and the command value may be compared with a predetermined threshold.

Further, although the FET has been used as each of the switching elements Q1 to Q6 in the inverter circuit 1 in the above embodiments, another switching element such as an IGBT (Insulated Gate Bipolar Transistor) may be used.

Moreover, although the three-phase motor has been taken as an example as the motor 4 in the above embodiments, one or more embodiments of the present invention is also applicable to the case of controlling a two-phase motor or a multiple-phase motor having four or more phases.

Furthermore, although the blushless motor has been taken as an example as the motor 4 in the above embodiments, one or more embodiments of the present invention is also applicable to a device for controlling an induction motor, a synchronous motor, or the like.

Additionally, although the example of applying one or more embodiments of the present invention to the electric power steering device of a vehicle has been cited in the above embodiments, one or more embodiments of the present invention is also applicable to a device other than the electric power steering device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A motor control device comprising: a motor driving circuit for driving a motor; a current detection circuit for detecting a motor current flowing through the motor driving circuit; and a controller for calculating a detected value of the motor current based on an output of the current detection circuit, comparing the detected value with a target value of the motor current, and generating a command value for allowing a motor current of the target value to flow through the motor based on a deviation therebetween, to output the command value to a motor driving circuit, wherein the current detection circuit is configured of a first current detection circuit having a positive first gain and a second current detection circuit having a negative second gain obtained by inverting the first gain, and the controller calculates a first detected value of the motor current based on an output of the first current detection circuit, and also calculates a second detected value of the motor current based on an output of the second current detection circuit, the controller adopting the first detected value or the second detected value as the detected value of the motor current when a sum of the first detected value and the second detected value satisfies a first condition, the controller adopting the first detected value as the detected value of the motor current when the sum of the first detected value and the second detected value does not satisfy a first condition and the first detected value and the command value satisfy a second condition, the controller adopting the second detected value as the detected value of the motor current when the sum of the first detected value and the second detected value does not satisfy a first condition and the second detected value and the command value satisfy a second condition.

2. The motor control device according to claim 1, wherein the controller executes control of the motor under a fixed limit when the sum of the first detected value and the second detected value does not satisfy the first condition and the first detected value or the second detected value and the command value satisfy the second condition.

3. The motor control device according to claim 1, wherein the controller stops control of the motor when the sum of the first detected value and the second detected value does not satisfy a first condition and the first detected value, the second detected value and the command value do not satisfy the second condition.

* * * * *